Jan. 17, 1950 J. E. FOX 2,494,802
LOW LEVEL SWITCH FOR HYDRAULIC BRAKES
Filed May 3, 1947
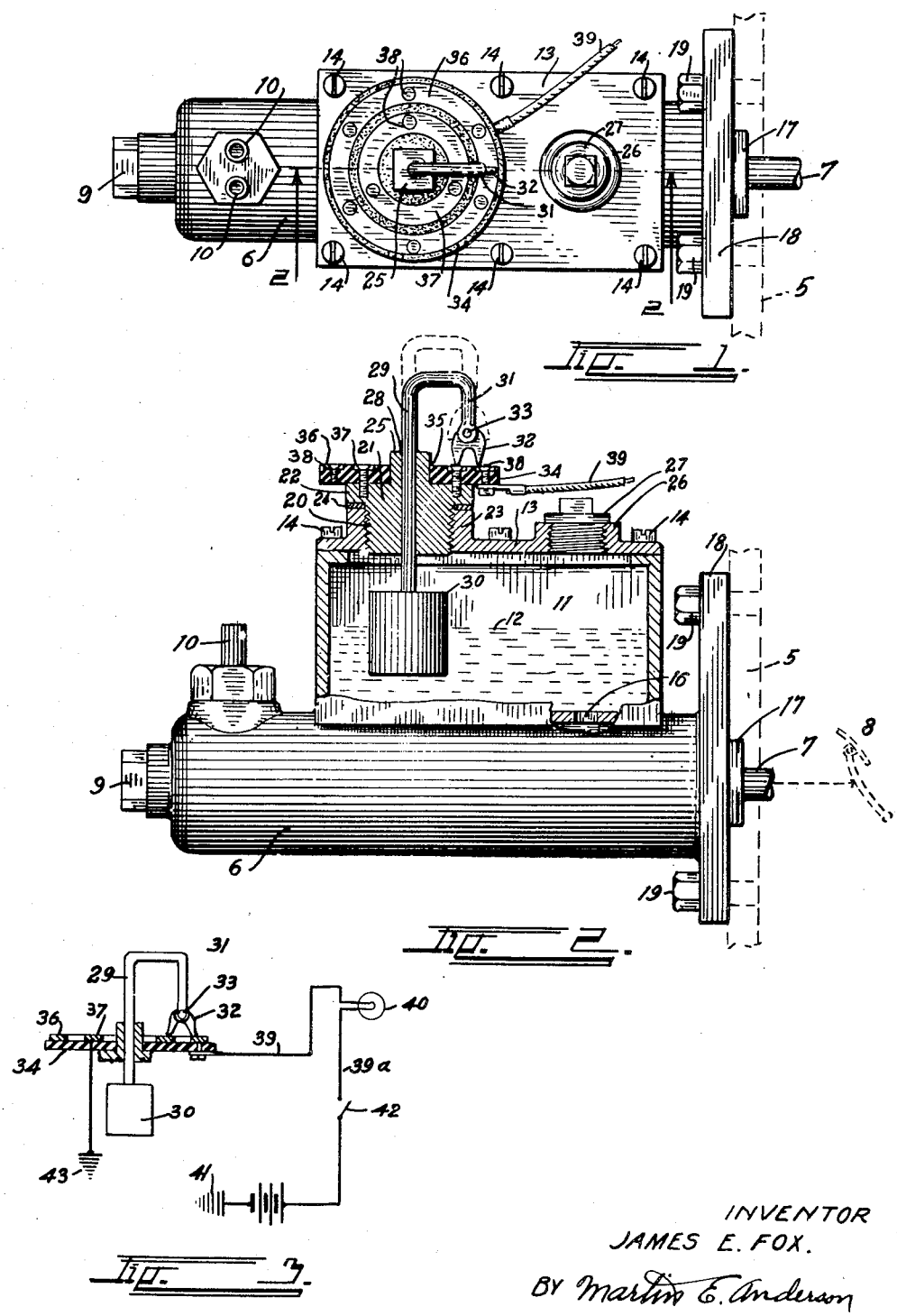
INVENTOR
JAMES E. FOX.
BY Martin E. Anderson
ATTORNEY.

Patented Jan. 17, 1950

2,494,802

UNITED STATES PATENT OFFICE 2,494,802

LOW LEVEL SWITCH FOR HYDRAULIC BRAKES

James E. Fox, Denver, Colo.

Application May 3, 1947, Serial No. 745,776

1 Claim. (Cl. 200—84)

This invention relates to improvements in devices for indicating a dangerously low level of brake fluid in a hydraulic brake fluid reservoir.

Hydraulic brakes are now quite universally employed in connection with automotive vehicles. Such brakes are dependent for successful operation on a sufficient supply of brake fluid to effect the transfer of force necessary.

Although hydraulic brake mechanisms are, as a rule, very carefully constructed and as nearly leak proof as possible, experience has shown that small leaks, especially past the piston in the master cylinder, will take place, and the fluid will gradually be dissipated. Service station operators recognizing this, usually check the level of the brake fluid in the brake cylinder reservoir and can thus determine the level conditions in time to remedy the same, providing the loss of the fluid is due to ordinary slow leaks.

In addition to the slight and slow loss of fluid that nearly always takes place, it sometimes happens that the pipes or connections through which the brake fluid is transferred from the master cylinder to the brake operating mechanism spring a leak, in which case the fluid disappears quite rapidly and unless some means is provided to apprise the driver of the fact that there is a shortage of brake fluid, he may discover this only when he tries to apply the brakes and finds that they do not respond. Such cases frequently result in serious accidents.

It is the object of this invention to produce an attachment that can be readily applied to any existing hydraulic brake mechanism for the purpose of signalling to the driver whenever the level of the brake fluid in the master cylinder reservoir falls to a dangerously low point, thereby warning him of this dangerous condition in time to prevent the occurrence of an accident.

The invention to which application relates can be most clearly explained and most readily understood when reference is had to the accompanying drawing in which the preferred embodiment thereof has been illustrated, and in which:

Figure 1 is a top plan view of a master cylinder and brake fluid reservoir showing the improved signalling apparatus in place;

Figure 2 is a section through the brake fluid reservoir taken substantially on line 2—2, Figure 1; and Figure 3 is a diagram of the wiring connections.

The master cylinder and reservoir that have been illustrated on the drawing are typical of such apparatus and the embodiment illustrated is therefore intended primarily for use in describing the attachment which is equally applicable to other specifically different constructions, all of which, however, are provided with a cylinder and reservoir in a manner somewhat similar to the one illustrated and which will now be described.

By means of broken lines, applicant has indicated a stationary part of the automobile to which the master cylinder is attached, which part has been identified by reference numeral 5. The master cylinder has been designated by reference numeral 6 and has been shown in elevation only because its interior construction is old and well known. The piston rod has been designated by reference numeral 7 and this is connected with the brake pedal in the usual manner. In the drawing the brake pedal has been shown by broken lines and indicated by reference numeral 8. The cylinder is closed at its inner end by means of a plug 9 and is provided with two or more tubes 10 from which suitable conduits extend to the brake mechanism at the wheels. On top of the brake cylinder is positioned a rectangular container forming a brake fluid reserve reservoir, which has been designated by reference numeral 11. The level of the brake fluid has been indicated by broken line 12. The reservoir has a substantially rectangular cross section in a horizontal plane and is provided with a removable cover 13 that is secured to the reservoir portion by means of screws 14. The bottom of the reservoir is provided with a hole 16 that communicates the interior thereof with the interior of the cylinder. This hole is located towards the left and at such a position that the brake fluid may flow from the reservoir into the cylinder when the piston 17 is in its inoperative or withdrawn position.

As above explained, this invention does not relate to the construction of the master cylinder and therefore the description will be limited to such features as appear to be necessary for proper understanding of the signal mechanism to which this invention relates. The master cylinder is provided with a base member 18 that is secured to the stationary part 5 by means of bolts or screws 19.

The cover 13 is provided with a fill opening 20 whose inner wall surface is threaded for the reception of a similarly threaded closure plug 21. This plug is of ordinary construction and has a flange 22 that overlaps the cylindrical wall 23 and engages the gasket 24. The closure plug has an upwardly extending square projection 25 by means of which it may be rotated. The cover 13, illustrated in this drawing, has been shown as provided with an auxiliary fill opening 26 closed by means of a plug 27. This auxiliary fill opening is not present in the usual construction but serves a useful purpose and is a great convenience when the usual fill opening and plug are utilized for operating the signal in a manner which will now be described.

Plug 21 is provided with an axial opening 28 through which a rod 29 extends. This rod must be of such size that it can slide freely in opening 28. A cork or hollow metal float 30 is secured to the lower end of rod 29 and rests on the surface of the brake fluid. The float 30 must, of course, have sufficient buoyancy to lift the rod with its attached parts from the position shown by full lines in Figure 2 to that designated by broken lines and the diameter must be somewhat smaller than the diameter of the fill opening so that it may be readily removed and inserted.

Rod 29 is reversely bent at the top terminating in a downwardly extending end 31 to which a forked switch contact 32 is connected by means of a pivot 33. The ends of forked member 32 terminate in sharp points for a purpose which will hereinafter appear. Secured to the top of plug 24 is a plate 34 of some material that is both electrically insulating and oil resistant. This plate is provided with a rectangular opening 35 for the reception of plug 25 and has secured to its upper surface two concentric rings of electrically conducting metal. The outer ring has been designated by reference numeral 36 and the inner, or smaller ring, has been designated by reference numeral 37. These rings are preferably made from some soft material such as solder or lead and are secured to the insulating plate by means of screws 38. Some of the screws that hold the smaller ring 37 in place are longer than the thickness of plate 34 and engage in threaded holes in plug 21 and therefore serve the double purpose of securing the ring in place and grounding the same to the plug which, in turn, is electrically connected with the automobile frame. The outer ring is of such size that the screws that hold this in place will be positioned outside of flange 22, thereby insulating that ring from the automobile frame. An electrical conductor 39 is connected with the outer ring in the manner shown in Figure 2 and extends to one terminal of a lamp socket, the lamp of which has been designated by reference numeral 40. Conductor 39a connects the other terminal of the lamp with one pole of the storage battery. The other pole of the storage battery is grounded at 41. A switch 42 may be provided in conductor 39a if desired. Since inner ring 37 is grounded at 43, it is evident that if rings 36 and 37 are interconnected by a conducting member, a circuit will be closed that will cause the lamp 40 to light. The pivoted and forked contact member 32 is intended and so proportioned and designed that it will form an electrical connection between the two rings when the level of the brake fluid sinks below a predetermined point, in which case the parts will assume the position shown in Figure 3. If the low level occurs when the automobile is in operation, the movement thereof will cause the contact between rings 36 and 37 to be intermittent, thereby producing a flashing of light 40, which will be very apparent both at night and during the day. When such flashing of the lamp occurs, the driver is warned to examine the condition of his brakes and to drive his car as cautiously as possible.

The forked conducting member 32 terminates in sharp points that penetrate any oil film on top of the conducting rings and since the latter are made from soft material, such as lead or solder, or any other material of a like nature, the electrical connection is effected quite readily by the weight of the parts comprising the float, the rod 29 and the forked contact.

Attention is called to the fact that this signal does not require any change in the present construction and that even the plug 21 that is furnished with the usual master cylinder assembly can be employed requiring merely the boring of a central opening 28 and probably a flattening of the upper surface so as to permit a ready attachment of the insulating plate. If the reservoir is not provided with an auxiliary fill opening like that shown, the plug 21 can readily be removed to permit the brake fluid to be increased, whenever occasion requires.

Having described the invention, what is claimed as new is:

A float operated switch for oil level indicators for hydraulic brake fluid reservoirs, comprising, an externally threaded plug having an axial opening, the threads on the plug being so proportioned to threadedly engage internal threads of a filler hole in a top wall of the reservoir a float stem mounted for free reciprocation in the opening and solely guided thereby, a float secured to the lower end of the stem of a size adapted to pass through the filler hole, the upper end of the stem having a laterally extending portion terminating in a downwardly extending end, a forked contact member pivoted to the downwardly extending end for rocking movement in a substantially radial plane, the ends of the forks having sharp points, a disk of insulating material secured to the upper end of the plug, in a plane perpendicular to the main portion of the stem and two rings of soft conresilient metal attached to the upper surface of the disk in concentric relation to the opening in the plug, the rings being each positioned underneath a finger of the forked contact, whereby, when the latter moves downwardly in response to a dangerously low level of brake fluid, the rings will be electrically interconnected by the forked contact, the inner ring being electrically connected with the plug and the outer ring insulated therefrom.

JAMES E. FOX.

REFERENCES CITED

The following references are of record in the file of this patent:

UNITED STATES PATENTS

| Number | Name | Date |
|---|---|---|
| 1,114,636 | Nelson | Oct. 20, 1914 |
| 1,319,146 | Fisk | Oct. 21, 1919 |
| 1,374,635 | Cleveland | Apr. 12, 1921 |
| 1,759,503 | Gerlach et al. | May 20, 1930 |
| 1,776,287 | Johnstone | Sept. 23, 1930 |
| 2,253,260 | Alcorn | Aug. 19, 1941 |

FOREIGN PATENTS

| Number | Country | Date |
|---|---|---|
| 13,384 | Great Britain | Aug. 7, 1891 |
| 84,123 | Austria | Aug. 15, 1920 |